Feb. 13, 1940. J. H. HOWARD 2,190,360
APPARATUS FOR MAKING TOOTHED CUTTERS AND THE LIKE
Filed July 11, 1938
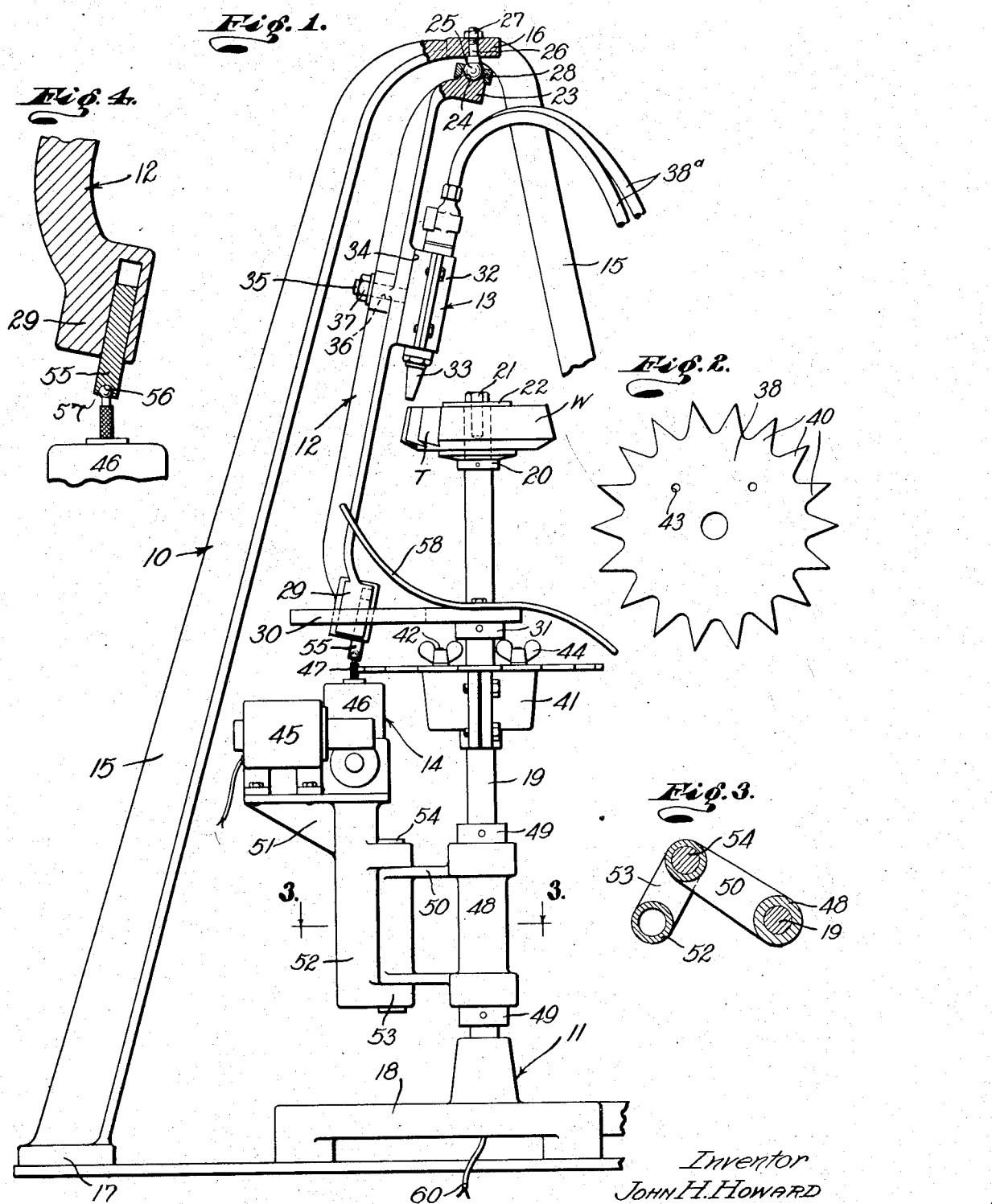
Inventor
John H. Howard
By
His Attorney Patented Feb. 13, 1940

2,190,360

UNITED STATES PATENT OFFICE 2,190,360

APPARATUS FOR MAKING TOOTHED CUTTERS AND THE LIKE

John H. Howard, Whittier, Calif.

Application July 11, 1938, Serial No. 218,718

9 Claims. (Cl. 266—23)

This invention relates to the manufacture of toothed cutters, gears and the like, and relates more particularly to means and methods for cutting or forming teeth in roller cutters, gears and similar articles. A general object of this invention is to provide a rapid, inexpensive method and a simple, practical apparatus for providing or cutting teeth in conical roller cutters, gears and other conical objects.

In the manufacture of the roller cutters used on well rock bits it has been the practice to either mill the toothed cutters from solid blanks or to cast the toothed cutters. The milling of roller cutters is a slow operation unless extremely large, expensive heavy-duty milling machines are employed. Such milling operations require the use of special milling cutters and when it is desired to modify the teeth shape or size it is necessary to obtain new milling cutters. This is usually accompanied by considerable delay.

Another object of this invention is to provide a method for making toothed roller cutters and like articles that does not necessitate the employment of expensive, heavy machinery.

Another object of this invention is to provide a method of the character mentioned utilizing a so-called flame cutter or torch to form or cut the teeth in the work or blank.

Another object of this invention is to provide a method of the character mentioned useful in the manufacture of conical roller cutters, conical gears and similar conical articles of various proportions.

Another object of this invention is to provide a compact and inexpensive apparatus for forming or cutting teeth in conical cutters and gears.

Another object of this invention is to provide an apparatus of the character mentioned that is adjustable to form teeth in conical objects of various sizes and to form teeth at various angles on such objects.

A further object of this invention is to provide an apparatus of the character mentioned that is substantially automatic and requires a minimum of attention and manipulation.

The various objects and features of my invention will be fully understood from the following detailed description of a typical preferred form of device and manner of carrying out the method of the invention, throughout which description reference is made to the accompanying drawing, in which:

Fig. 1 is a side elevation of the apparatus of the invention with a portion of the frame broken away and with a part appearing in vertical cross section to illustrate the ball and socket joint. Fig. 2 is a plan view of the template removed from the machine. Fig. 3 is a transverse detailed sectional view taken as indicated by line 3—3 on Fig. 1, and Fig. 4 is an enlarged fragmentary vertical sectional view illustrating the connection between the arm and the roller.

It is believed that the method of the present invention will be better understood following a detailed description of the apparatus for carrying out the steps of the method. Accordingly, I will proceed with a detailed description of a typical preferred form of apparatus of the invention and will then describe the method as employed in connection with the operation of the apparatus.

The machine or apparatus of the present invention illustrated in the drawing may be said to comprise, generally, a frame 10, a pedestal 11 for carrying the work W, a movable depending arm 12 on the frame 10, a cutting torch 13 carried by the movable arm 12 and means 14 for moving and directing the arm 12 to cause the torch 13 to cut teeth T in the work W.

The frame 10 is a supporting structure provided to carry the movable arm 12. In the typical embodiment of the invention illustrated the frame 10 comprises a plurality of spaced upwardly converging legs 15 having their upper ends joined or connected at a central part 16. There may be three or more legs 15 embodied in the frame 10. Suitable feet 17 are provided on the lower ends of the legs 15 to rest on the support or floor. It is to be understood that the frame 10 may be of any suitable or convenient construction and need not be of the particular construction illustrated.

The pedestal 11 is provided to carry the work W and the means 14 for operating or moving the arm 12. In the case illustrated the pedestal 11 includes a base 18 and a post 19 projecting upwardly from the base 18. The base 18 is adapted to rest on the floor and the post 19 is fixed to the base. The post 19 is preferably in vertical and axial alignment with the vertical center of the frame part 16. A collar 20 is removably secured to the post 19 adjacent its upper end and the work W is adapted to be arranged on the post to rest on the collar 20. A screw 21 may be threaded in the upper end of the post 19 to engage downwardly against a washer 22 on the upper end of the work W to hold the work in place.

In the typical application of the invention illustrated the work W is in the nature of a frusto-conical blank having flat upper and lower ends and a tapered periphery. The work W may be considered as the blank of a frusto-conical roller cutter to be used on a rock bit of the class employed in the rotary method of well drilling. It is to be understood that work blanks or other devices or articles may be mounted on the post 19 for cutting or formation by the machine. The work W is arranged on the post 19 to have its small end face upwardly.

The arm 12 is provided to support or carry the cutting torch 13. The arm 12 is an elongate member having its upper end connected with the frame part 16. In practice the arm 12 may be formed of angle iron or T iron. An enlargement or boss 23 is provided on the upper end of the arm 12. The boss 23 is offset inwardly from the longitudinal axis of the arm 12. A suitable universal joint is provided between the frame part 16 and the arm 12 to provide for the necessary movement of the arm. This joint includes a socket 24 in the upper end of the boss 23 and a ball 25 cooperating with the socket. The ball 25 is carried on the lower end of a bolt 26 passed through a central vertical opening in the frame part 16. A nut 27 is threaded on the bolt 26 to secure the ball to the frame part 16. A sleeve 28 is threaded on the boss 23 and engages about the ball 25 to retain the ball in cooperation with the socket 24. It will be apparent that the arm 12 is suspended in the frame by the ball and socket joint in such a manner that it is free to move or swing as required. It will be observed that the ball and socket joint connecting the arm 12 with the frame 10 is offset from the longitudinal axis of the arm so that the arm extends downwardly on what will be termed a cone angle or the conical angle of the work W.

The invention includes means for guiding or directing the arm 12. A square or flattened block 29 is provided or formed on the lower end of the arm 12 and a guide yoke 30 is arranged on the pedestal post 19 to receive the block 29. The yoke 30 is turnable on the post 19 and may rest against a suitable collar 31 on the post. The block 29 is free to slide or shift in and out of the yoke 30 relative to the post 19 so that the arm 29 is free to pursue a course around the vertical axis of the work W and is free to move in and out with respect to said axis. The guide means just described allows the arm 12 to assume a position in any one of an infinite number of radial planes of the conical work W but prevents the arm 12 from swinging laterally or tangentially relative to the cone of the work W.

The cutting torch 13 is carried by the arm 12 so that its flame may act on the work W. The present invention is not primarily concerned with the details of the torch 13 as any suitable or practical form of flame cutting torch may be utilized. The body of the torch 13 is held in a clamp 32 and is positioned so that its nozzle 33 faces downwardly or in a general downward direction. A raised or inwardly projecting boss 34 is provided on the inner side of the arm 12 and the clamp 32 bears against the boss. The boss 34 is located so that the nozzle of the torch 33 is spaced inwardly from the inner side of the arm 12 and is spaced between the upper and lower ends of the arm. The location of the torch 33 on the arm 12 depends upon several factors, such as: the diameter of the work W; the relationship between the diameters of the template 38, to be hereinafter described, and the work W; etc. The cutting torch 13 is preferably adjustable on the arm 12. A bolt or stud 35 projects outwardly from the clamp and is turnable received in an opening 36 in the boss 34 and the arm 12. The stud 35 projects outwardly from the arm 12 and a nut 37 is threaded on the stud to lock or retain the torch 13 in the selected position. When the nut 37 is loosened the torch 13 may be adjusted to any selected angular position with respect to the arm 12 and the vertical axis of the work W. The oxygen and gas hoses 38$^a$ extend from the upper end of the torch 13 to their respective sources of supply (not shown).

The means 14 for moving and directing the arm 12 automatically or mechanically moves and controls the arm 12 in such a manner that the torch 13 caried by the arm cuts teeth T of the desired shape and character in the work W. The means 14 includes the template 38 carried by the pedestal 11. The template 38 may be in the nature of a disc and its periphery is shaped to cause the torch 13 to make teeth of the required shape in the blank or work W. In the case illustrated a multiplicity of sharp peripheral teeth 40 is provided on the template 38. The template 38 is removably fixed or secured on the pedestal post 19 to be coaxial or concentric with the work W. A split hollow boss or collar 41 is clamped on the post 19 below the guide yoke 30 and has spaced upwardly projecting studs 42. Prior to the arrangement of the collar 31 the yoke 30, the collar 20 and the work W on the post 19, the template 38 is slid down the post 19 to rest on the clamp 41. Openings 43 in the template 38 receive the studs 42 and thumb nuts 44 are threaded on the studs 42 to lock the template in place. The collar or clamp 41 is non-rotatable on the post 19 and the template 38 is likewise fixed against turning. The template 38 arranged as just described occupies a horizontal plane adjacent and below the lower end of the arm 12.

The means 14 further includes a driving or actuating mechanism for the movable arm 12. This mechanism includes a motor 45 and a speed reducing gear or drive 46 associated with the motor. The motor 45 is preferably a variable speed motor and its circuit (not shown) is suitably controlled to provide for the desired range of operating speeds. The motor driven drive 46 carries or drives a roughened or knurled roller 47. The roller 47 projects from the upper side of the speed reducing drive 46 and is rotatable about a vertical axis. The roller 47 is positioned to cooperate with the teeth 40 of the template 38. The roller 47 is knurled or roughened to have a traction engagement with the edges or faces of the template teeth and this engagement causes the motor 45 and the associated parts to follow the paths of the teeth 40.

The motor 45 and the associated parts are mounted on the pedestal 11 to be movable and follow the path of the roller 47 along the template teeth 40. A sleeve 48 is turnable on the pedestal post 19 between spaced collars 49 and has radially projecting arms 50. A bracket 51 carries the motor 45 and the drive 46 and has a depending part 52 provided with spaced projecting arms 53. The arms 50 and 53 are preferably in mating or nesting relation. A pivot pin 54 passes through vertical openings in the arms 50 and 53 to connect the motor bracket 51 with the turnable sleeve 48 on the pedestal post 19. The motor 45 and the associated drive 46 and the roller 47 supported as just described are movable around and in and out with respect to the pedestal post 19 so that the roller 47 may cooperate with and follow the teeth 40.

A connection is provided between the roller 47 and the torch carrying arm 12 whereby the bodily movement of the roller is transmitted to the arm and the torch 13. This connection may comprise a stem 55 projecting downwardly from the lower end of the arm 12 or its block 29. A socket 56 is formed in the lower end of the stem 55 and a spherical head or ball 57 is provided on the upper end of the roller 47 to cooperate with the socket 56. The ball 57 is free to rotate in the socket 56 and the stem 55 has a certain amount of vertical movement with respect to the block 29 to allow for the relative angular movement between the arm 12 and the roller 47 during in and out movement of the arm. It will be seen that the cooperation of the ball 57 with the socket 56 transmits the bodily movement of the roller 47 to the depending movable arm 12. Thus the movement of the roller along the template teeth 40 is transmitted to the torch 13.

The template 38 may be magnetized to insure a uniform engagement and traction between the roller 47 and the template teeth 40. The template 38 may be permanently magnetized or may be magnetized by a suitable electromagnetic means contained in the clamp or collar 41 and supplied with current by conductors 60 extending through an opening in the post 19. A slag deflector 58 is provided to prevent the slag resulting from the flame cutting operation, from falling into the template 38, the roller 47, the motor 45, etc. The deflector may be in the nature of a curved plate secured to the guide yoke 30 and disposed below the work W.

The operation of the apparatus and the method of the invention as carried out by the apparatus are as follows. When a template 38 of the desired configuration and the work W have been arranged on the pedestal 11 as illustrated in the drawing the apparatus is in condition for operation. If it is desired to cut straight axial teeth T in the work W the torch 13 is positioned as shown with its longitudinal axis in the angle of the cone of the work W. When the torch 13 and the motor 45 are in operation the flame from the torch cuts away the metal of the work W in the well-known manner and the roller 47 rotates in contact with the edges or faces of the template teeth 40 to direct and advance the torch. It will be apparent how the rotating knurled roller 47 engaging the teeth 40 and the magnetized template 38 causes the arm 12 to follow the path prescribed by the teeth 40 and therefore causes the torch 13 to follow the same path. As clearly illustrated in Fig. 1 the longitudinal axis of the torch 13 includes or passes through the center of the ball 25 and intersects the longitudinal axis of the work W at the same point. The longitudinal axis of the torch 13 also intersects or passes close to the point of engagement of the roller 47 with the teeth 40. Because of this relationship of parts the torch 13 is operable to cut true axial teeth in the periphery of the conical work W. As described above the engagement of the rotating roller 47 with the template teeth 40 produces in and out movement of the torch 13 and relatively slow movement of the torch around the work so that the torch forms the series of peripheral teeth T in the tapered blank or work W.

When the several teeth T have been completed the motor 45 is de-energized and the torch 13 turned off, whereupon the work may be removed from the post 19 and the operation repeated on a second piece of work. If it is desired to cut pitched or inclined teeth in the work W the nut 37 is loosened and the torch 13 is adjusted or turned about the axis of the stud 35 to have its longitudinal axis tangential to the adjacent element of the cone of the work W. In forming the inclined or pitched teeth T in the work W the above described procedure is carried out.

From the above it will be seen that the method of the present invention comprises the stationary supporting or mounting of the work W, the suspension or mounting of the torch 13 at an angle to the cone of the work W or tangent to said cone, and the movement and directing of the torch 13 around the work and in and out with respect to the work W to cut the teeth T therein.

Having described only a typical preferred form of apparatus and manner of carrying out the method of my invention I do not wish to be limited or restricted to the specific details herein set forth, but wish to reserve to myself any modifications or variations that may appear to those skilled in the art or fall within the scope of the following claims.

I claim:
1. Apparatus for cutting teeth in a conical blank comprising means for supporting the blank, a flame cutting torch, means supporting the torch at approximately the angle of the cone of the blank and for movement around and in and out relative to the longitudinal axis of the blank, and means for moving and directing the torch in and out relative to said axis while moving it around said axis and maintaining the torch at said angle during said movement to cut peripheral longitudinal teeth in the blank.

2. Apparatus for cutting teeth in a conical blank comprising means for supporting the blank, a supporting structure, a member supported by the structure for universal movement about a point in the longitudinal axis of the blank, a flame cutting torch on the member, and actuating and guiding means for moving the member in such a manner that the torch forms axial peripheral teeth in the blank.

3. Apparatus for cutting teeth in a conical blank comprising means for supporting the blank, a flame cutting torch, means supporting the torch at approximately the angle of the cone of the blank and for movement around and in and out relative to the longitudinal axis of the blank, said means comprising a supporting structure, and an arm carrying the torch and supported by said structure for universal movement about a point in the longitudinal axis of the blank, and power actuated means for moving and directing the arm.

4. Apparatus for cutting teeth in a conical blank comprising means for supporting the blank, a flame cutting torch, means supporting the torch at approximately the angle of the cone of the blank and for movement around and in and out relative to the longitudinal axis of the blank, said means comprising a supporting structure, an arm, means suspending the arm from the structure for universal movement about a point in the longitudinal axis of the blank, and means securing the torch to the arm to direct its flame against the blank, and power actuated means for moving and directing the arm to cause the flame to form axial teeth on the blank.

5. Apparatus for cutting teeth in a conical blank comprising means for supporting the blank, a flame cutting torch, means supporting the torch at approximately the angle of the cone of the blank and for movement around and in and out relative to the longitudinal axis of the blank, said means comprising a supporting structure, and an arm carrying the torch and supported by said structure for universal movement about a point in the longitudinal axis of the blank, a toothed template, and means connected with the arm and cooperable with the teeth of the template to move and direct the arm so that the torch cuts axial teeth in the blank.

6. Apparatus for cutting teeth in a conical blank comprising means for supporting the blank, a flame cutting torch, means supporting the torch at approximately the angle of the cone of the blank and for movement around and in and out relative to the longitudinal axis of the blank, said means comprising a supporting structure, an arm, means suspending the arm from the structure for universal movement about a point in the longitudinal axis of the blank, and means supporting the torch on the arm for adjustment about an axis transverse of the arm and to direct its flame against the blank, and means for moving and directing the arm to cause the flame to form axial teeth on the blank.

7. An apparatus for cutting peripheral teeth in a conical blank comprising a pedestal, a frame, means supporting the blank on the pedestal, an arm, a cutting flame torch on the arm, means suspending the upper end of the arm from the frame for universal movement about a point in the longitudinal axis of the blank whereby the torch lies in or adjacent the angle of the cone of the blank, and means for moving and directing the arm to cause the torch to cut axial peripheral teeth in the blank.

8. An apparatus for cutting peripheral teeth in a conical blank comprising a pedestal, a frame, means supporting the blank on the pedestal, an arm, means for suspending the arm from the frame for universal movement about a point in the longitudinal axis of the blank, a flame cutting torch secured to the arm to lie in the angle of the cone of the blank, and means for moving and directing the arm so that the torch cuts axial peripheral teeth in the blank.

9. Apparatus for shaping a conical blank comprising means for supporting the blank, a cutting torch, means supporting the torch for universal movement about a point in the longitudinal axis of the blank, and actuating and directing means moving the torch around said axis while maintaining the torch at approximately the angle of the cone of the blank.

JOHN H. HOWARD.